United States Patent
Chorian et al.

(10) Patent No.: US 9,397,328 B2
(45) Date of Patent: Jul. 19, 2016

(54) FLEXIBLE BUSBAR HOLDER FOR WELDED CELLS

(71) Applicant: Ford Global Technologies, LLC, Dearborn, MI (US)

(72) Inventors: Steven F. Chorian, Canton, MI (US); Steven Droste, Ypsilanti, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 14/160,636

(22) Filed: Jan. 22, 2014

(65) Prior Publication Data

US 2015/0207126 A1 Jul. 23, 2015

(51) Int. Cl.
| | | |
|---|---|---|
| *H01M 2/22* | (2006.01) | |
| *H01M 2/20* | (2006.01) | |
| *H01M 2/30* | (2006.01) | |
| *B60L 11/18* | (2006.01) | |
| H01M 10/625 | (2014.01) | |
| H01M 10/647 | (2014.01) | |
| H01M 10/6554 | (2014.01) | |
| H01M 10/613 | (2014.01) | |

(52) U.S. Cl.
CPC ........... *H01M 2/206* (2013.01); *B60L 11/1877* (2013.01); *H01M 10/613* (2015.04); *H01M 10/625* (2015.04); *H01M 10/647* (2015.04); *H01M 10/6554* (2015.04); *H01M 2220/20* (2013.01); *Y02T 10/7005* (2013.01); *Y02T 10/705* (2013.01)

(58) Field of Classification Search
CPC ........... H01M 2/20; H01M 2/10; H01M 2/22; H01M 2/26; H01M 2/30; H01M 2/206; B60L 11/1877
See application file for complete search history.

(56) References Cited

U.S. PATENT DOCUMENTS

| | | | |
|---|---|---|---|
| 4,255,838 A | 3/1981 | Obst et al. | |
| 5,329,424 A | 7/1994 | Patel | |
| 6,097,173 A * | 8/2000 | Bryant, Jr. ............ | H01M 2/206 320/107 |
| 6,672,889 B2 | 1/2004 | Biermeier et al. | |
| 2003/0096515 A1 | 5/2003 | Biermeier et al. | |
| 2006/0178051 A1* | 8/2006 | Hashida ............. | H01R 13/5213 439/627 |
| 2007/0252556 A1* | 11/2007 | West ..................... | H01M 2/202 320/116 |
| 2009/0155680 A1* | 6/2009 | Maguire ............. | H01M 2/1077 429/158 |
| 2010/0216008 A1* | 8/2010 | Yoon ..................... | H01M 2/305 429/158 |
| 2011/0097620 A1* | 4/2011 | Kim ..................... | H01M 2/1061 429/161 |

* cited by examiner

*Primary Examiner* — Kenneth Douyette
(74) *Attorney, Agent, or Firm* — David B. Kelley; Brooks Kushman P.C.

(57) ABSTRACT

A traction battery assembly is provided including a support member, two battery cells, a busbar, and a segmented busbar holder. The battery cells include adjacent terminals at differing heights relative to the support member. The busbar is attached to the terminals. The segmented busbar holder includes adjacent panels configured to cover and orient the busbar relative to the terminals. The panels are also configured to move relative to one another such that the holder accommodates the differing heights of the terminals.

20 Claims, 6 Drawing Sheets

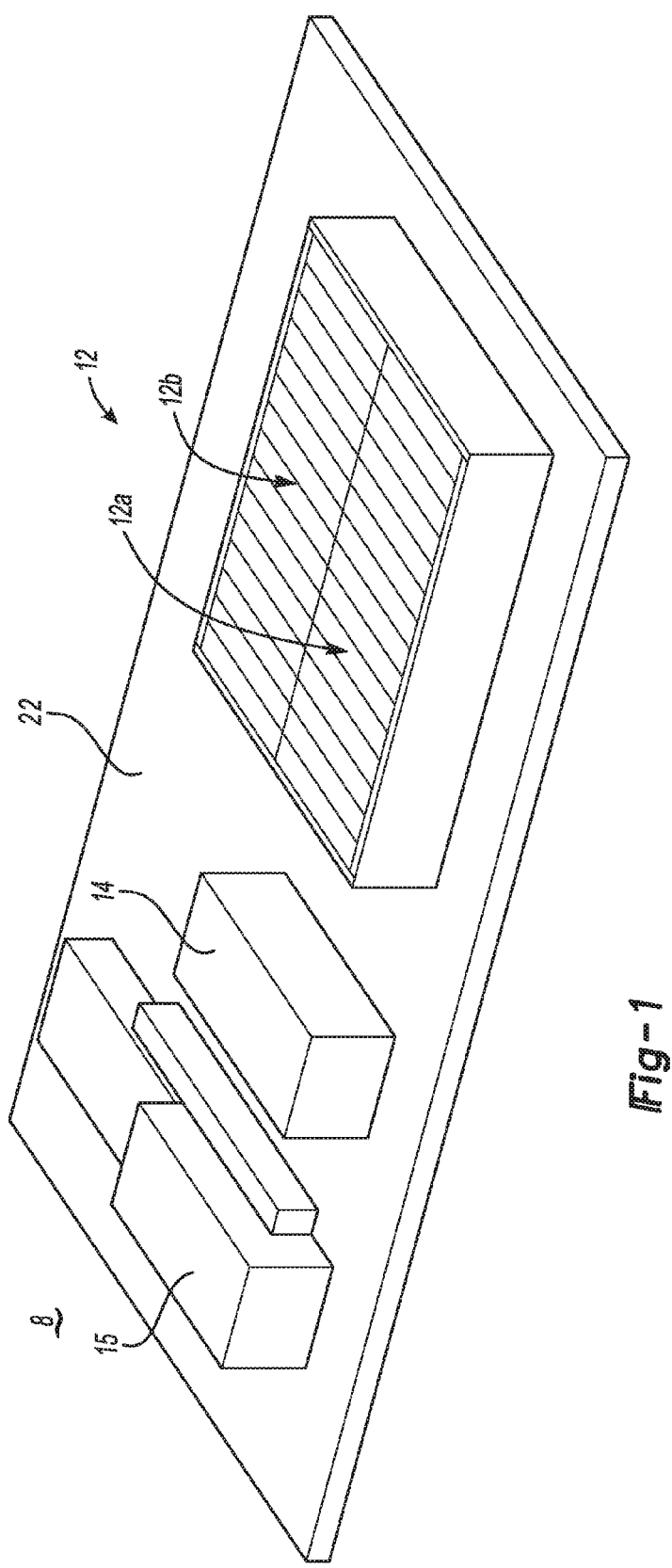

FLEXIBLE BUSBAR HOLDER FOR WELDED CELLS

TECHNICAL FIELD

This disclosure relates to busbars and busbar holders for vehicle traction batteries.

BACKGROUND

Vehicles such as battery-electric vehicles (BEVs), plug-in electric vehicles (PHEVs) or hybrid-electric vehicles (HEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in regulating temperature of the HV battery components, systems, and individual battery cells.

SUMMARY

A vehicle includes first and second battery cells having an adjacent pair of terminals. A busbar is bonded to and electrically connects the pair of terminals. A busbar holder includes a pair of arms, each disposed over one of the terminals. The busbar holder defines a cavity to receive the busbar which orients and aligns the busbar relative to the terminals. The arms are spaced apart from each other and are movably connected via a living hinge such that non-coplanarity between the terminals results in a flexing of the living hinge and corresponding non-coplanarity between the arms. The busbar holder may include a pair of channel members defining a channel. The pair of channel members may be movably connected via a second living hinge. The terminals may each include a contact surface with differing heights relative to a support member for the first and second battery cells. The differing heights may be defined by a tolerance stack up of the first and second battery cells. The support member may be a thermal plate or a battery tray. The arms may define a space between the arms which is positioned above a substantially central portion of the busbar.

A traction battery assembly includes a support member and battery cells having adjacent terminals at differing heights relative to the support member. A busbar is attached to the terminals. A segmented busbar holder includes adjacent panels configured to cover and orient the busbar. The adjacent panels are also configured to move relative to one another such that the holder accommodates the differing heights. The support member may be a thermal plate or a battery tray. The busbar holder may include adjacent channel members movably connected via a living hinge. The channel members may each define a channel. The adjacent panels may define a space between the panels which is above a substantially central portion of the busbar. The adjacent panels may define a cavity to receive the busbar and position the busbar above the terminals.

A traction battery assembly includes a thermal plate and adjacent first and second battery cells supported by the thermal plate. The first and second battery cells include terminals with differing heights relative to the thermal plate. A busbar is attached to the two terminals. A busbar holder includes two sections spaced apart and movably connected via a living hinge. Each section includes a channel member and an arm. The arms define a cavity sized to receive the busbar and are arranged to orient and align the busbar with the terminals. The two sections are spaced away from the thermal plate at differing heights in accordance with the differing heights of the terminals. The two sections may define a space between the two sections which is above a substantially central portion of the busbar. The living hinge may movably connect the two sections at a portion of the channel members. The arms may be configured to move relative to one another such that the busbar holder accommodates the differing heights of the terminals. A second busbar holder may be spaced apart and movably connected to the busbar holder via a living hinge.

BRIEF DESCRIPTION OF THE DRAWINGS

FIG. 1 is a perspective view of components of a battery pack.

DETAILED DESCRIPTION

Figure 3:
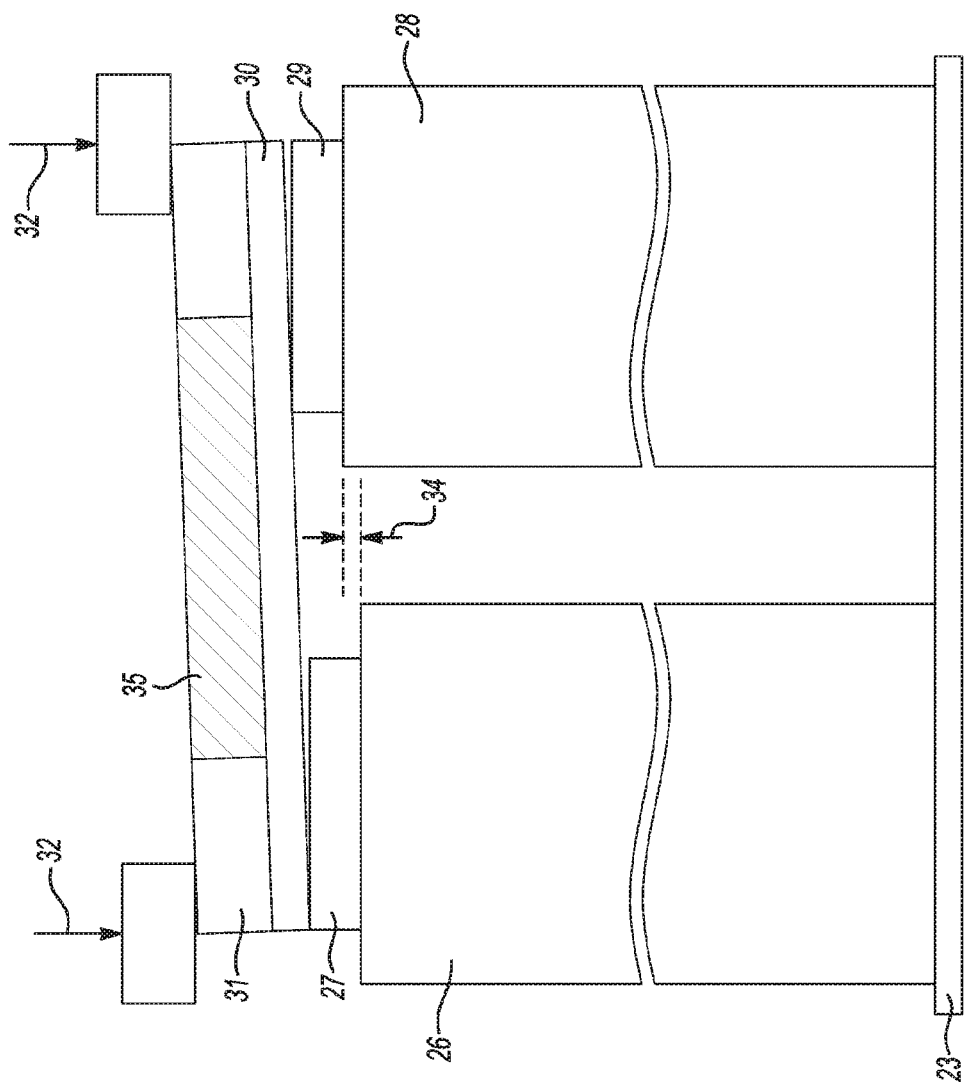
FIG. 3 is an illustrative view of two battery cells, a busbar, and a busbar holder shown under clamping forces.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles which utilize an HV battery may include an energy system having a battery pack with components such as one or more battery arrays with battery cells, a battery electrical control module ("BECM"), and a DC/DC converter module with a DC/DC converter unit. The battery cells may provide energy to operate a vehicle drive motor and other vehicle systems. The battery pack may be positioned at several different locations including below a front seat, a rear seat, or a location behind the rear seat of the vehicle. One or more battery cell arrays, sometimes referred to as battery, cell stacks may be in electrical communication with the BECM, DC/DC converter unit and other vehicle components. The BECM may receive input signals from various control systems, process information included in the input signals, and generate appropriate control signals in response thereto. These control signals may activate and/or deactivate the various components. The DC/DC converter unit may convert high voltage from the battery cells into low voltage for use by the components and systems.

Each battery cell array may include battery cells supported by a member. Examples of the supporting member may include a thermal plate, such as a cold plate, and/or battery tray. The battery cells, such as prismatic cells, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in a battery cell array with multiple battery cells, the terminals of each battery cell may be aligned with opposing terminals (positive and negative) adjacent to one another, and a busbar may assist in facilitating a series connection between the multiple battery cells. The cells may also be arranged in parallel such that similar terminals (positive and positive or negative and negative) are adjacent to one another. For example, two battery cells may be arranged with positive terminals adjacent to one another, and the next two battery cells may be arranged with negative terminals adjacent to one another. In this example, the busbar may contact terminals of all four battery cells.

Different battery pack configurations may be available to address individual vehicle variables including packaging constraints and power requirements described further herein. The battery cells may be heated and/or cooled with a thermal management system. Examples of thermal management systems may include air cooling systems, liquid cooling systems and a combination of air and liquid systems. Busbars may assist in completing the series and/or parallel connections between adjacent battery cells or groups of battery cells proximate to one another.

For example and now referring to FIG. 1, components of an illustrative battery pack 8 are shown which may include two battery cell arrays 12a and 12b (jointly referred to as "battery cell arrays 12"), a BECM 14, a DC/DC converter unit 15 and a liquid cooling system (not shown). The battery cell arrays 12 may be components of a traction battery. A battery pack tray 22 may support the components of the battery pack 8.

The number and type of individual battery cells in battery cell arrays 12 may vary. In one example, prismatic cells may be used. Prismatic cells may include two terminals such as an Aluminum terminal (Al terminal) and a Copper terminal (Cu terminal). When positioned in an array or stack with multiple battery cells, the Al terminals and Cu terminals of each battery cell may be adjacent to one another to assist in facilitating a series connection between the battery cells. Multiple battery pack 8 configurations may be available to manage and transfer energy from battery cells of the battery cell arrays 12 in accordance with individual vehicle variables such as packaging constraints and power requirements.

Figure 2:
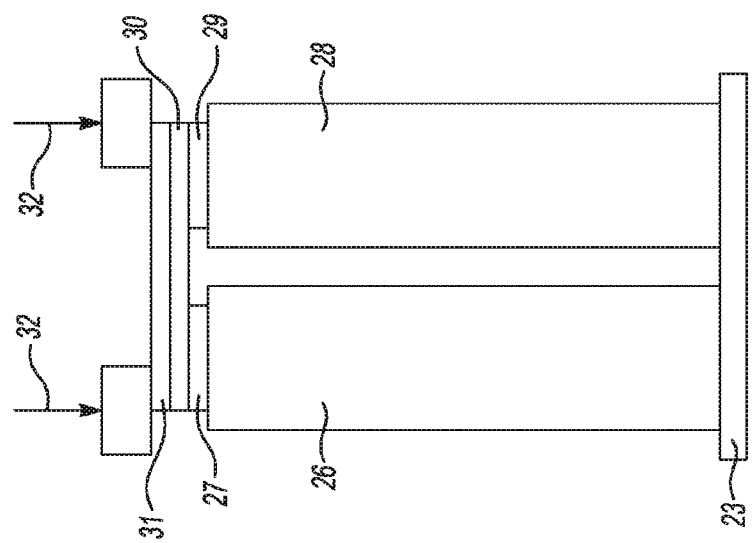
FIG. 2 is an illustrative view of two battery cells, a busbar, and a busbar holder shown under clamping forces.

One example configuration includes positioning battery cells adjacent to one another in an array to assist in facilitating a series connection across the array. Now referring to FIG. 2, a first battery cell 26 may include an Al terminal 27 and a Cu terminal (not shown). A second battery cell 28 may include a Cu terminal 29 and an Al terminal (not shown). First battery cell 26 and second battery cell 28 may be supported by a member 23. Examples of supporting member 23 may include a thermal plate, such as a cold plate, or battery tray. A busbar 30 may be welded to both the Al terminal 27 and the Cu terminal 29. In order to facilitate a proper weld, it may be preferable for the busbar 30 to directly contact and be substantially flush with Al terminal 27 and Cu terminal 29. A busbar holder 31 may assist in positioning the busbar 30 relative to the Al terminal 27 and Cu terminal 29 such that a clamping force 32 may be applied to the busbar 30 and busbar holder 31 to assist in achieving the preferable busbar-terminal contact for welding. In the example shown in FIG. 2, the first battery cell 26 and second battery cell 28 have the same height, and contact surfaces of the terminals are in substantially the same plane such that busbar 30 is flush or substantially flush to the terminals. However, battery cells adjacent to one another and within an array may not have the same height due to, for example, battery cell manufacturing variances and/or due to battery cell installation. One example of the differing heights may include a tolerance of plus or minus one millimeter. Battery cells may be compressed together during installation and this compression may not be uniform across the array, thus potentially creating terminal height deltas between battery cells. As such, terminals in a battery cell array may have different heights relative to the supporting member of the battery cells, such as a thermal plate.

Figure 4:
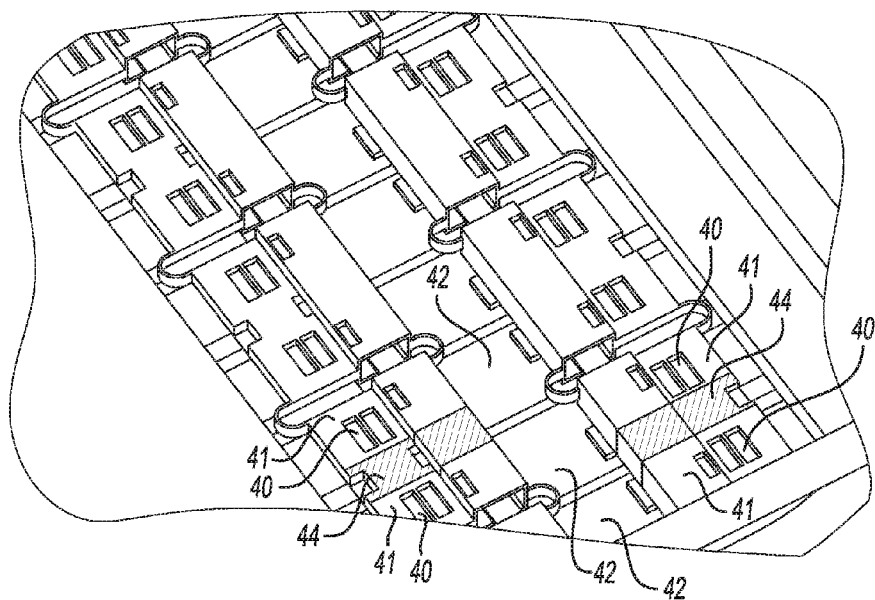
FIG. 4 is a perspective view of a sequence of busbar holders installed on battery cells.

For example and now referring to FIG. 3, first battery cell 26 and second battery cell 28 have different cell heights as indicated by terminal height delta 34. In this scenario, busbar 30 is not flush to both terminals 27 and 29. When clamping forces 32 are applied, the busbar holder 31 may break, the busbar 30 may not achieve desired contact with the terminals for welding purposes, and/or the clamping force 32 required to achieve the desired contact may exceed allowable parameters. Area 35 may represent a zone of the busbar holder 31 susceptible to breaking when the clamping forces 32 are applied. As another example, FIG. 4 shows a sequence of busbars 40 and busbar holders 41 installed on a sequence of battery cells 42. Area 44 of busbar 40 may be an area likely to break under clamping forces since the busbar holders 41 in this example do not have a flexing capability at area 44. As such, it may be desirable for busbar holders to include a flexing capability to accommodate for the terminal height deltas while assisting in positioning busbars to contact terminals.

Figure 5:
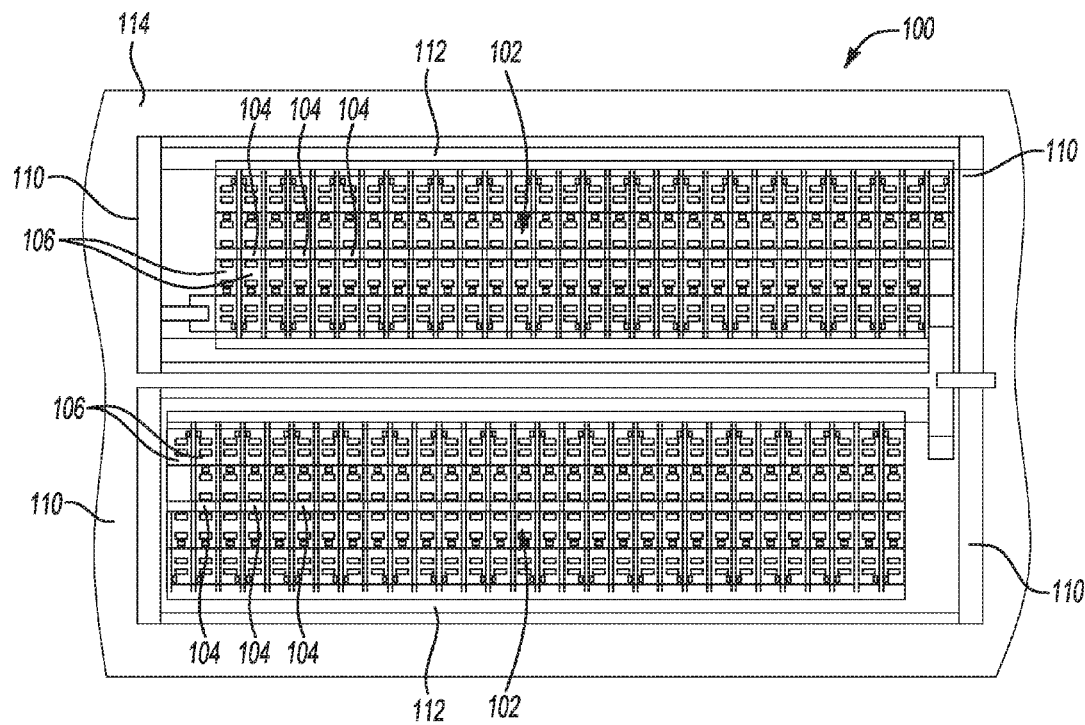
FIG. 5 is a top view of two battery cell arrays.
Figure 6:
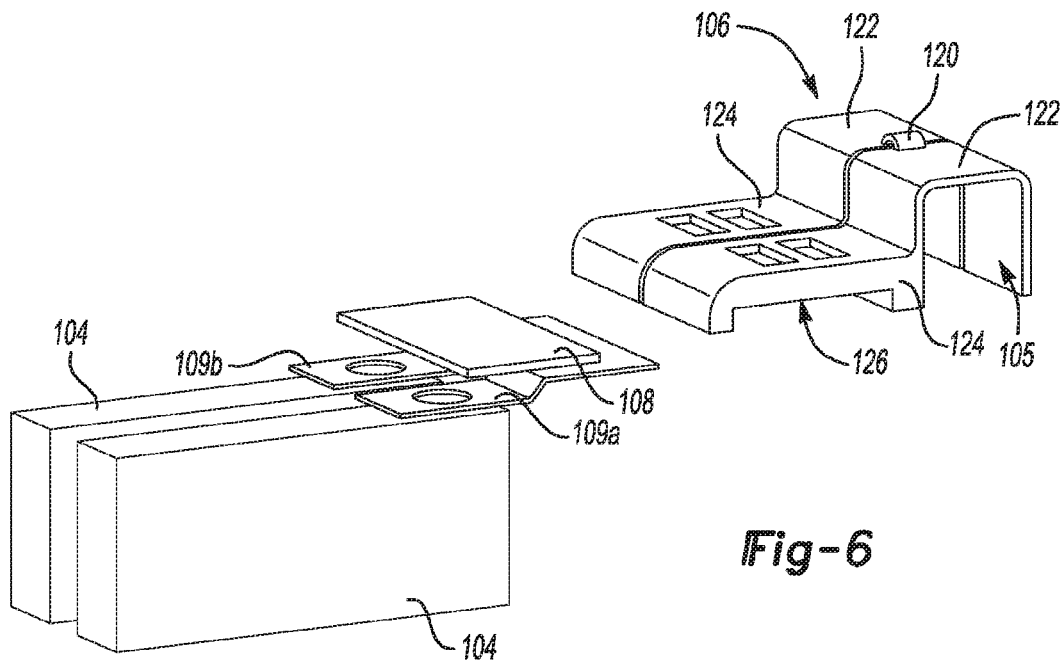
FIG. 6 is an exploded perspective view of a busbar assembly and two battery cells.

For example and now referring to FIGS. 5 and 6, an illustrative battery module 100 may include two battery cell arrays 102. End caps 110, rail sections 112 and battery pack tray 114 may assist in retaining the two battery cell arrays 102 therebetween. Battery module 100 may provide energy to assist in powering a vehicle and may be positioned, for example, below a front or rear seat. The battery cell arrays 102 may each include battery cells 104 positioned adjacent to one another. The busbar holders 106 may assist in positioning the busbars 108 such that the busbars 108 may complete an electrical connection between, for example, terminals 109a and 109b of the adjacent battery cells 104.

Figure 7:
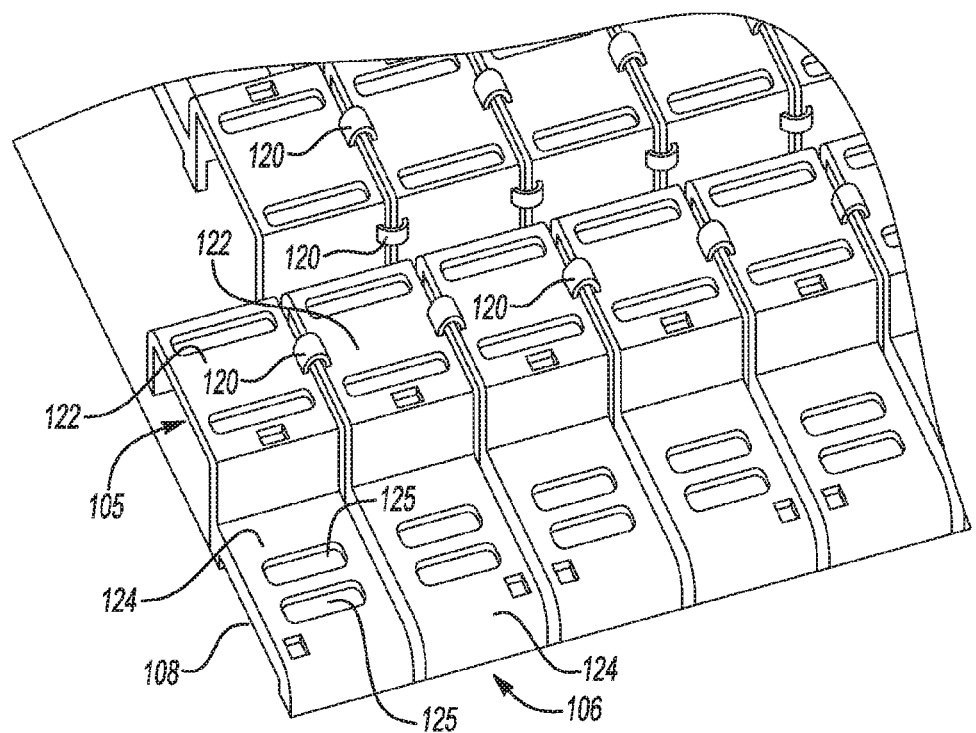
FIG. 7 is a perspective view of a sequence of busbar holders.
Figure 8:
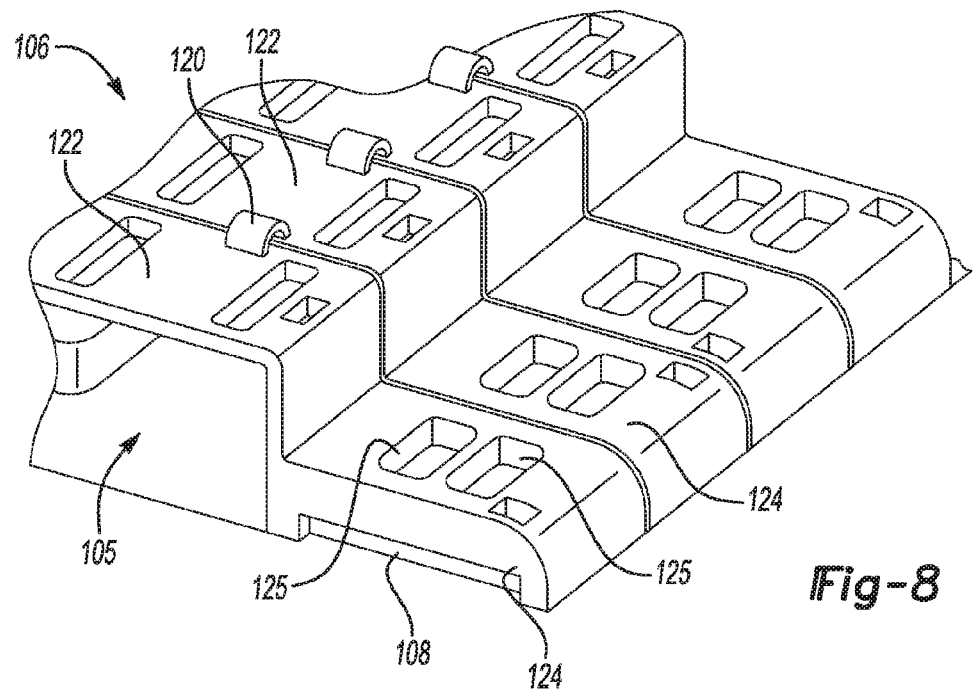
FIG. 8 is a perspective view of a sequence of busbar holders.
Figure 9:
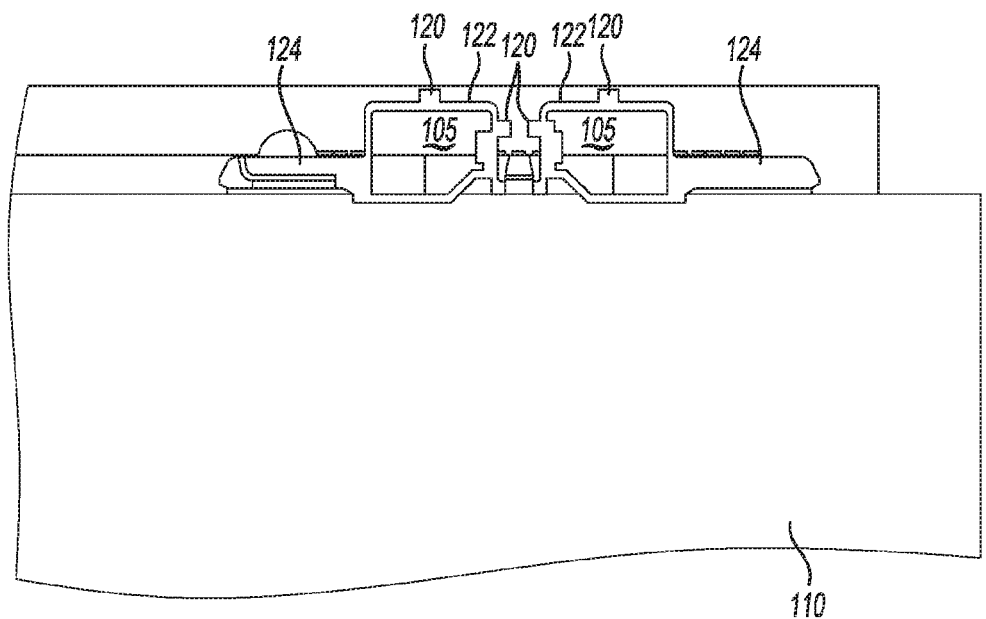
FIG. 9 is a side view of a battery cell array.
Figure 10:
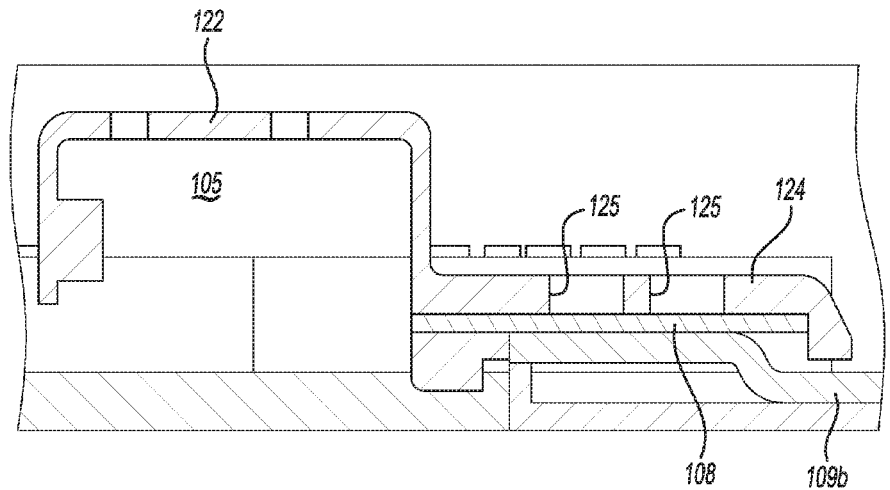
FIG. 10 is a side view, in cross-section, of a busbar and busbar holder.

Continuing to refer to FIG. 6 and now additionally referring to FIGS. 7 through 10, each busbar holder 106 may be segmented and include two sections spaced apart. The sections may include a channel member 122 and an arm 124. The channel member 122 may include a U-shape and define a channel 105 to house wires along the battery cell arrays 102. The arms 124 may also be referred to as panels and define a space therebetween which may be located above a substantially central portion of the busbar 108. The arms 124 may define a cavity 126 and one or more apertures 125. The cavity 126 may be sized to receive a portion or portions of the busbar 108 to assist in orienting and aligning the busbar 108 with the terminals. The busbar 108 may be bonded to and electrically connect the terminals. The busbar holder 106 may further include a living hinge 120 flexibly connecting the two sections such that the two sections are movably connected. Additionally, living hinges 120 may flexibly attach or connect a sequence of busbar holders 106 to match an according array of battery cells. Optionally and/or alternatively, the busbar holder 106 may have more than one living hinge 120. For example, two living hinges 120 may flexibly attach or connect the two sections at two locations on channel member 122 as shown in FIG. 7. The living hinge or hinges 120 may also flexibly attach or connect the arms 124 or a combination of the arms 124 and channel members 122. As such, the busbar holder 106 may flex when force is applied thereto and the two segments may move relative to one another.

Figure 11:
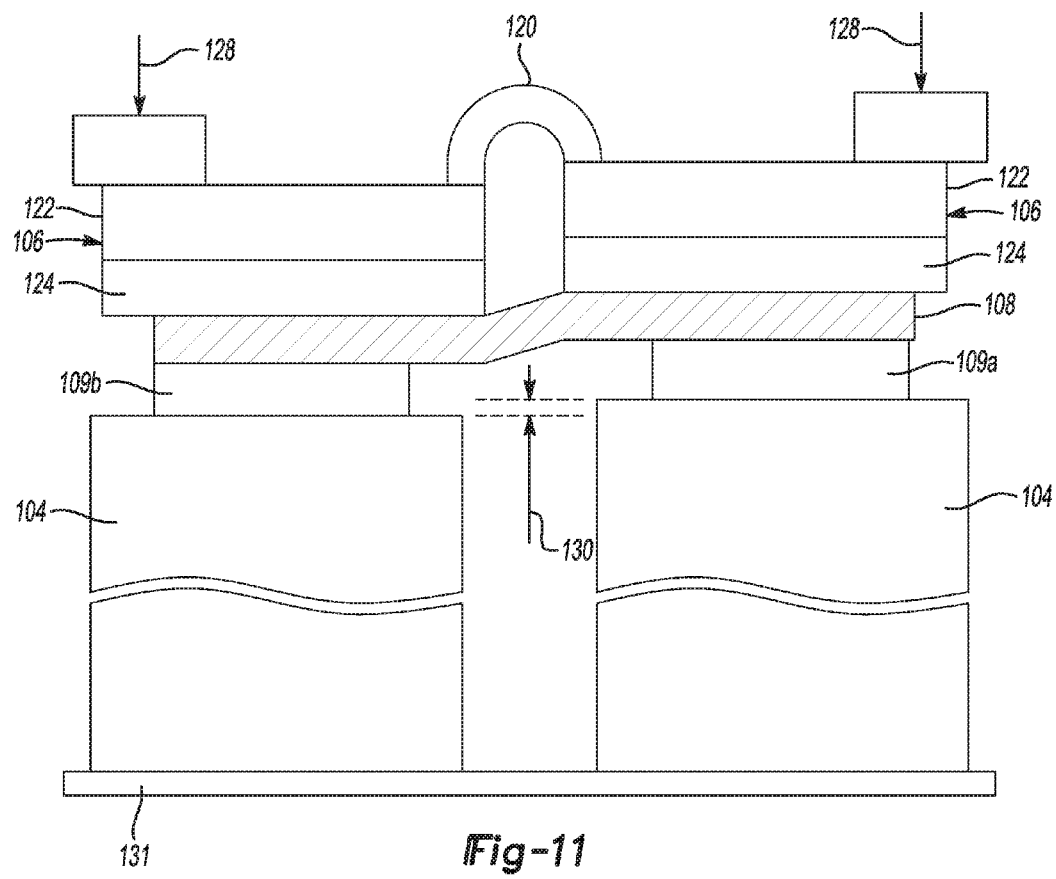
FIG. 11 is an illustrative view of two battery cells, a busbar, and a busbar holder shown under clamping forces.

For example and now referring to FIG. 11, busbar holder 106 and busbar 108 are shown positioned above battery cells 104 and each cell's respective terminal 109a and 109b. Here, the terminals 109a and 109b may define different planes. The battery cells 104 may be supported by a support member 131. Examples of the supporting member 131 may include a thermal plate or battery tray. An application of clamping forces 128 may cause the busbar holder 106 to flex and the busbar 108 may deform in accordance to contact with terminals 109a and 109b. In contrast to the illustrative example in FIG. 3, living hinge 120 may flex under the clamping force 128 to accommodate terminal cell height delta 130. The terminal height delta 130 may have varied dimensions including being three millimeters or less. A tolerance stack up of the battery cells 104 may define the differing cell heights. The flexibility of living hinge 120 may prevent busbar holder 106 from breaking under the clamping force 128 while also assisting in maintaining contact between the busbar 108 and terminals 109a and 109b to facilitate a proper weld. Additionally, the clamping force 128 may be less than a clamping force required for a rigid busbar holder. The cavity 126 may receive the busbar 108 to further assist in positioning the busbar 108 for a proper weld. As mentioned above, the cavity 126 may be formed on each of the arms 124 and configured such that the busbar 108 may be held within the cavity 126 of each arm 124.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly of a vehicle comprising:
    first and second battery cells having an adjacent pair of terminals;
    a busbar bonded to and electrically connecting the terminals; and
    a busbar holder including a pair of arms each disposed over one of the terminals, defining a cavity for the busbar, and configured to orient and align the busbar relative to the terminals, wherein the arms are spaced apart from each other and movably connected via a living hinge such that non-coplanarity between the terminals results in a flexing of the living hinge and corresponding non-coplanarity between the arms.

2. The traction battery assembly of claim 1, wherein the busbar holder further includes a pair of channel members defining a channel.

3. The traction battery assembly of claim 2, wherein the pair of channel members are movably connected via a second living hinge.

4. The traction battery assembly of claim 1, wherein the terminals each include a contact surface with differing heights relative to a support member for the first and second battery cells.

5. The traction battery assembly of claim 4, wherein the differing heights are defined by a tolerance stack up of the first and second battery cells.

6. The traction battery assembly of claim 4, wherein the support member is a thermal plate.

7. The traction battery assembly of claim 4, wherein the support member is a battery tray.

8. The traction battery assembly of claim 1, wherein the arms define a space therebetween and above a substantially central portion of the busbar.

9. A traction battery assembly comprising:
    a support member;
    battery cells having adjacent terminals at differing heights relative to the support member;
    a busbar attached to the terminals; and
    a segmented busbar holder including adjacent panels configured to cover and orient the busbar and move relative to one another such that the holder accommodates the differing heights.

10. The traction battery assembly of claim 9, wherein the support member is a thermal plate.

11. The traction battery assembly of claim 9, wherein the busbar holder further includes adjacent channel members movably connected via a living hinge.

12. The traction battery assembly of claim 11, wherein the channel members each define a channel.

13. The traction battery assembly of claim 9, wherein the adjacent panels define a space therebetween and above a substantially central portion of the busbar.

14. The traction battery assembly of claim 9, wherein the adjacent panels define a cavity to receive the busbar and are configured to position the busbar above the terminals.

15. A traction battery assembly comprising:
    a support member;
    adjacent first and second battery cells supported by the support member and including terminals with differing heights relative to the support member;
    a busbar attached to the terminals; and
    a busbar holder including two sections spaced apart and movably connected via a living hinge, wherein each section includes a channel member and an arm, wherein the arms define a cavity sized to receive the busbar and arranged to orient and align the busbar with the terminals, and wherein the two sections are spaced away from the support member at differing heights in accordance with the differing heights of the terminals.

16. The traction battery assembly of claim 15, wherein the two sections define a space therebetween and above a substantially central portion of the busbar.

17. The traction battery assembly of claim 15, wherein the living hinge movably connects the two sections at a portion of the channel members.

18. The traction battery assembly of claim 15, wherein the arms are configured to move relative to one another such that the busbar holder accommodates the differing heights of the terminals.

19. The traction battery assembly of claim 15, further comprising another busbar holder spaced apart and movably connected to the busbar holder via a living hinge.

20. The traction battery assembly of claim 15, wherein the support member is a thermal plate.

* * * * *